(12) United States Patent
Yoshida et al.

(10) Patent No.: US 6,493,294 B1
(45) Date of Patent: Dec. 10, 2002

(54) DISC REPRODUCING DEVICE

(75) Inventors: Susumu Yoshida, Saitama-ken (JP); Kenji Uchiyama, Saitama-ken (JP); Tomomichi Kimura, Saitama-ken (JP); Kenjiro Ido, Saitama-ken (JP); Toru Suzuki, Saitama-ken (JP); Takashi Mizoguchi, Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/323,850

(22) Filed: Jun. 2, 1999

(30) Foreign Application Priority Data

Jun. 3, 1998 (JP) .......................... 10-154825

(51) Int. Cl.⁷ ............................................ G11B 17/22
(52) U.S. Cl. .................................................. 369/30.81
(58) Field of Search ........................... 369/36, 38, 75.1, 369/178, 191, 30.81, 30.82

(56) References Cited

U.S. PATENT DOCUMENTS

| | | | | |
|---|---|---|---|---|
| 5,117,409 A | * | 5/1992 | Shimizu et al. ............... | 369/36 |
| 5,481,512 A | * | 1/1996 | Morioka et al. ............... | 369/36 |
| 5,532,985 A | * | 7/1996 | Nakamichi .................... | 369/34 |
| 5,602,818 A |   | 2/1997 | Kage et al. | |
| 5,761,185 A | * | 6/1998 | Horiguchi et al. ........... | 369/270 |
| 5,917,787 A | * | 6/1999 | Tsuchiya et al. .............. | 369/36 |
| 5,959,949 A | * | 9/1999 | Yamashita et al. ............ | 369/36 |
| 6,052,356 A | * | 4/2000 | Fujimoto et al. ........... | 369/192 |
| 6,097,693 A | * | 8/2000 | Nakamichi ................... | 369/270 |

FOREIGN PATENT DOCUMENTS

| | | | |
|---|---|---|---|
| EP | 0 519 069 | | 12/1992 |
| JP | 62-047893 | * | 3/1987 |
| JP | 63-200354 | * | 8/1988 |
| JP | 63-204548 | * | 8/1988 |

* cited by examiner

Primary Examiner—William Klimowicz
(74) Attorney, Agent, or Firm—Arent Fox Kintner Plotkin & Kahn

(57) ABSTRACT

A disc storage is provided for storing a plurality of trays, each for holding a disc. The trays are stacked in the storage. A movable member is provided to be moved in the vertical direction. A disc player, a tray moving device are mounted on the movable member. The tray moving device is provided to be engaged with trays for moving the trays and for increasing a space between a desired tray and an adjacent disc for receiving disc player, and for decreasing the space during the reproduction of the desired disc.

9 Claims, 20 Drawing Sheets

DISC REPRODUCING DEVICE

BACKGROUND OF THE INVENTION

The present invention relates to a device for reproducing an optical disc selected from a plurality of discs stored in a disc storage, and more particularly to a disc reproducing device mounted on a motor vehicle.

There is known a disc reproducing device for reproducing an optical disc selected from a plurality of discs stored in a disc storage.

In recent years, a disc changer has been proposed which disc changer reproduces a disc at its arranged position.

The disc changer is moved along the disc storage in the disc arranging direction. When the selected disc is reproduced, disc mounting trays adjacent the selected disc are moved in the disc arranging direction so that spaces are formed on both sides of the selected disc. A disc reproducing portion is inserted into the spaces to reproduce the disc. Thus, the size of the disc changer is reduced in the direction perpendicular to the disc arranging direction. Hence, the disc changer is suitable to be mounted on the motor vehicle.

However, there is a problem that the size of the disc changer is increased in the disc arranging direction in order to form spaces on the both sides of the selected disc. In addition, another space must be formed in the disc changer for supporting the disc reproducing portion in a floating state during the reproduction of the disc as a measure against external vibration in the disc changer for the motor vehicle.

SUMMARY OF THE INVENTION

An object of the present invention is to provide a disc reproducing device the size of which may be reduced in the disc arranging direction.

According to the present invention, there is provided a disc reproducing device comprising, a disc storage, a plurality of trays, each for holding a disc, arranged in a disc arranging direction in the disc storage and slidably held in the storage so as to be moved in the disc arranging direction, a movable member provided to be moved in the disc arranging direction, first driving means for moving the movable member in the disc arranging direction, a disc player having a disc clamper and mounted on the movable member, a tray moving member mounted on the movable member and provided to be engaged with trays, second driving means for driving the tray moving member for moving the trays and for increasing a space between a desired disc and a disc adjacent the desired disc for receiving the disc player and for decreasing the space after clamping of the desired disc with the disc clamper, third driving means for moving the disc player between a retracted position and a disc reproducing position.

The disc arranging direction is a vertical direction, and the trays are stacked.

The tray moving member is rotatably mounted on the movable member, and has a plurality of cams to be engaged with trays for raising the trays and for forming the space between trays.

The first driving means comprises a pair of slide plates, each slide plate has at least one inclined hole having a plurality of steps corresponding to the number of the trays, a pin secured to the movable member and engaged with the inclined hole, and means for sliding the slide plate.

The disc player is pivotally mounted on the movable member, and the third driving means is provided for rotating the disc player.

The disc reproducing device further comprises a floating supporting device for supporting the disc reproducing device in a floating state, and lock means for locking the floating supporting device when the disc is not reproduced.

These and other objects and features of the present invention will become more apparent from the following detailed description with reference to the accompanying drawings.

DETAILED DESCRIPTION OF THE PREFERRED EMBODIMENT

Figure 1:
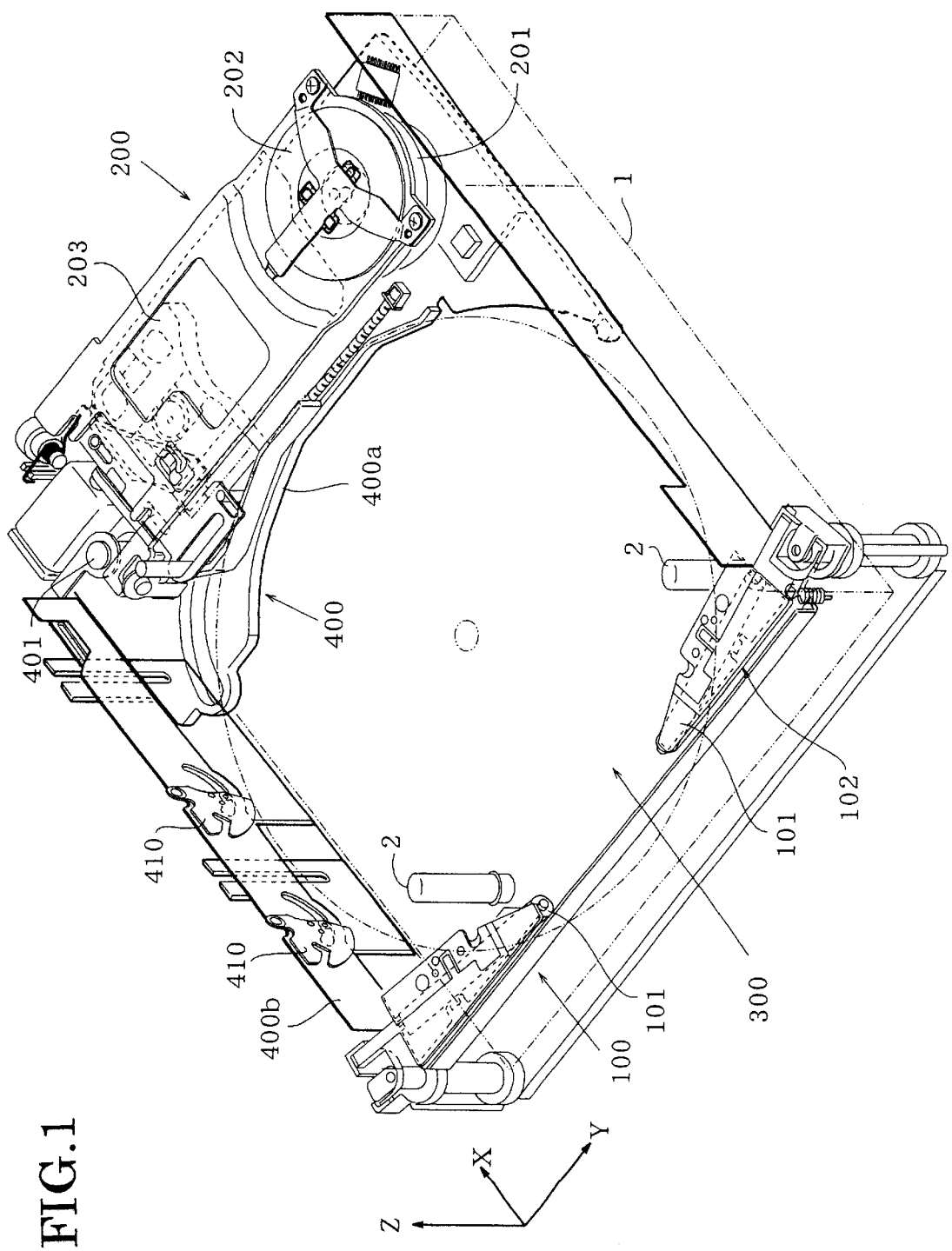
FIG. 1 is a perspective view of a disc changer according to the present invention.
Figure 2:
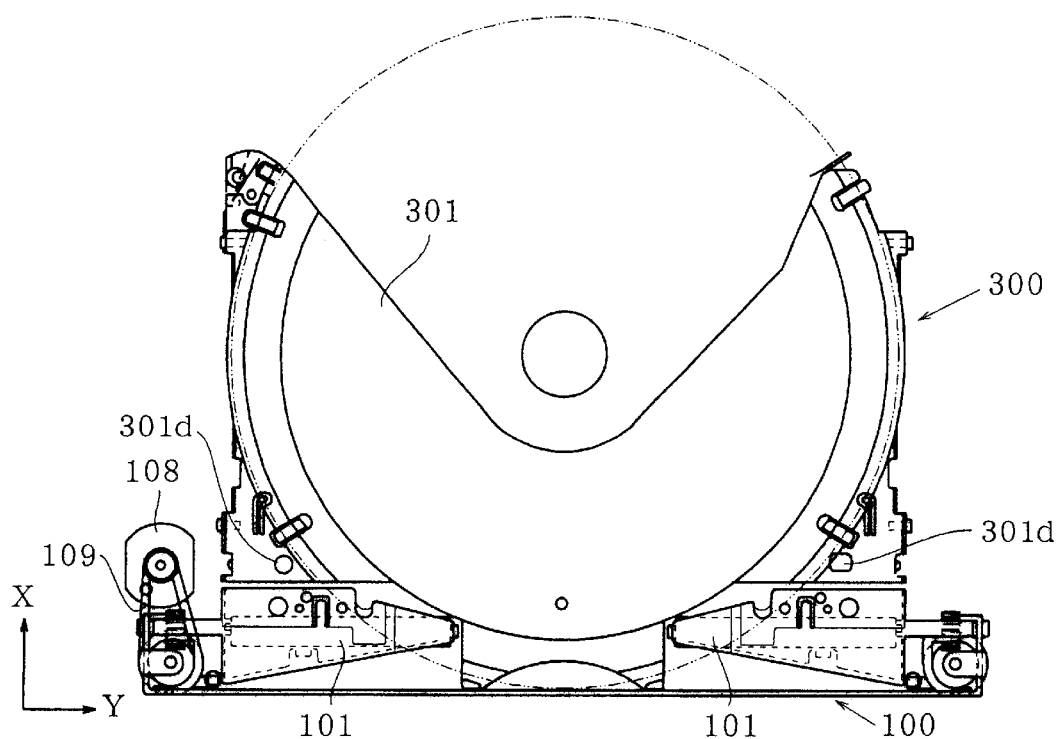
FIGS. 2a, 2b and 3 are plan views of a part of the disc changer.
Figure 2:
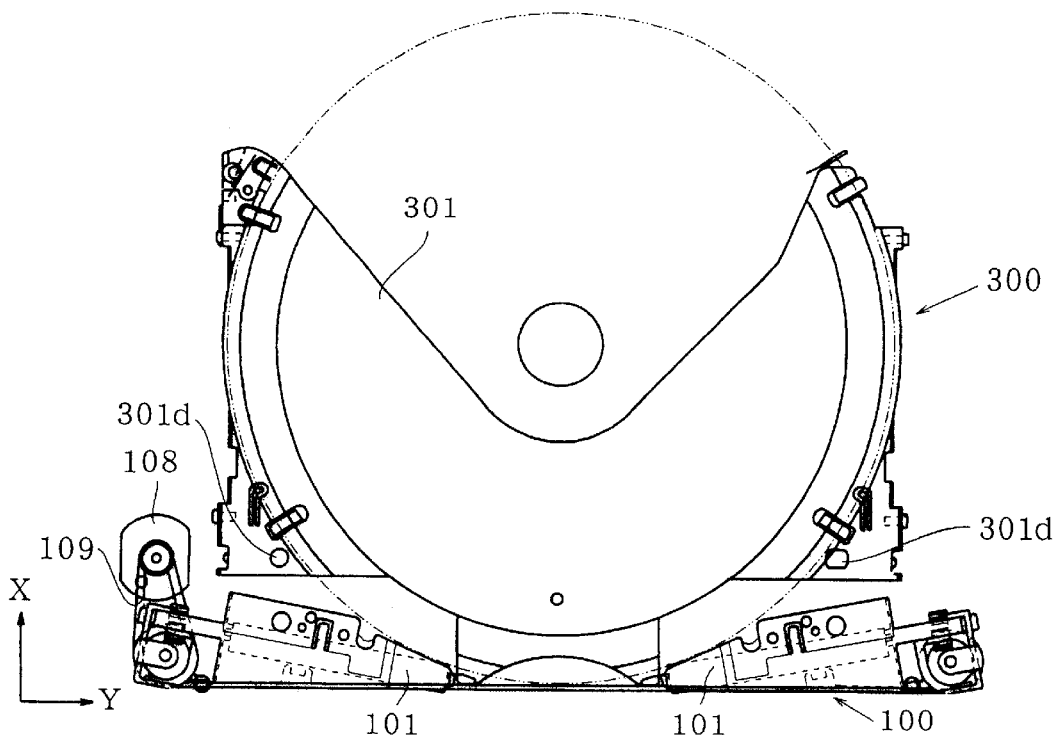

Referring to FIGS. 1, 2a and 2b showing the disc changer according to the present invention, main composition of the device comprises a disc carrier 100 having a pair of driving rollers 101, a disc player 200 having a turntable 201, clamper 202, pickup 203, a disc storage 300 having six trays 301 (FIG. 2) for arranging discs in the Z-direction and a tray moving mechanism having a movable plate 400 for moving the tray 301. These portions are provided in a chassis 1.

The disc carrier 100 is provided for carrying a disc inserted from an opening by a user to the disc storage 300, and for discharging the disc from the storage 300.

The driving rollers 101 are provided to contact with the underside of the inserted disc and to carry it in the X-direction.

Figure 3:
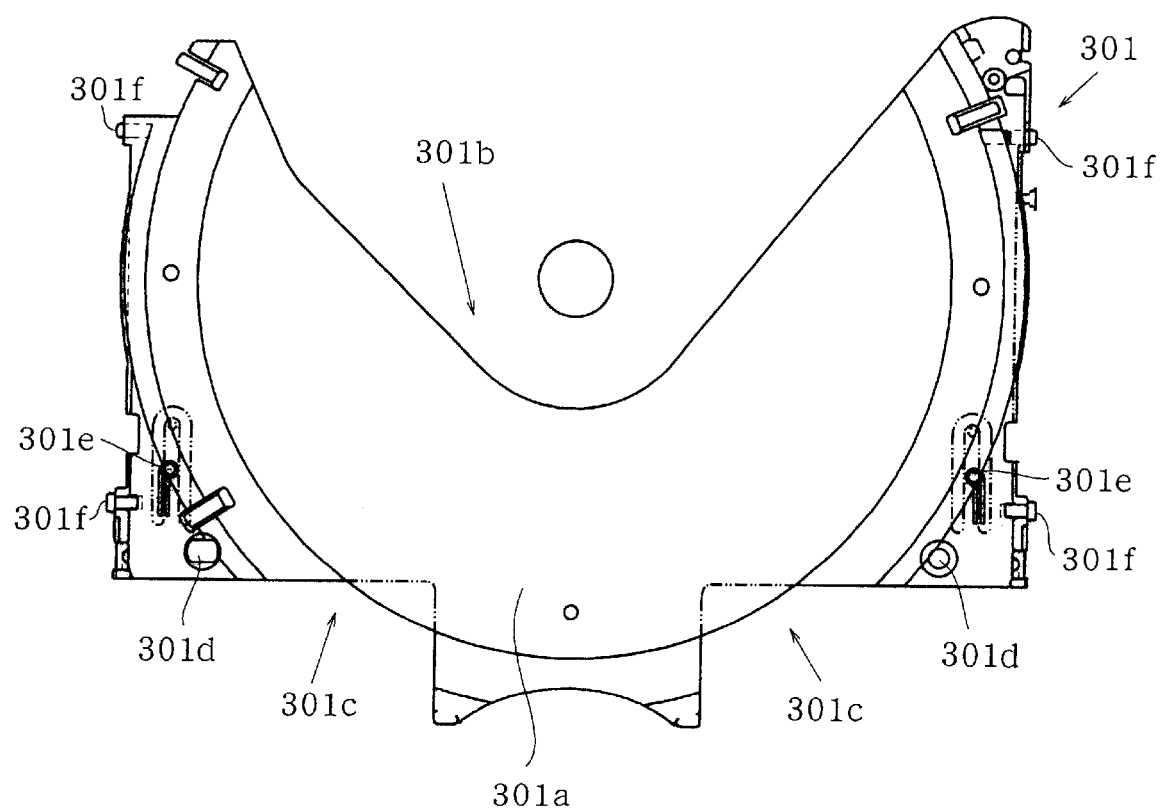

Referring to FIG. 3, the tray 301 has a disc supporting plate 301a having a V-shaped notch 301b and a pair of notches 301c. In the notch 301b, the turntable 201, clamper 202 and pickup 203 are inserted. Furthermore, the tray 301 has a pair of holes 301d in which guide shafts 2 are inserted, a pair of disc holding members 301e, four projections 301f.

Figure 4:
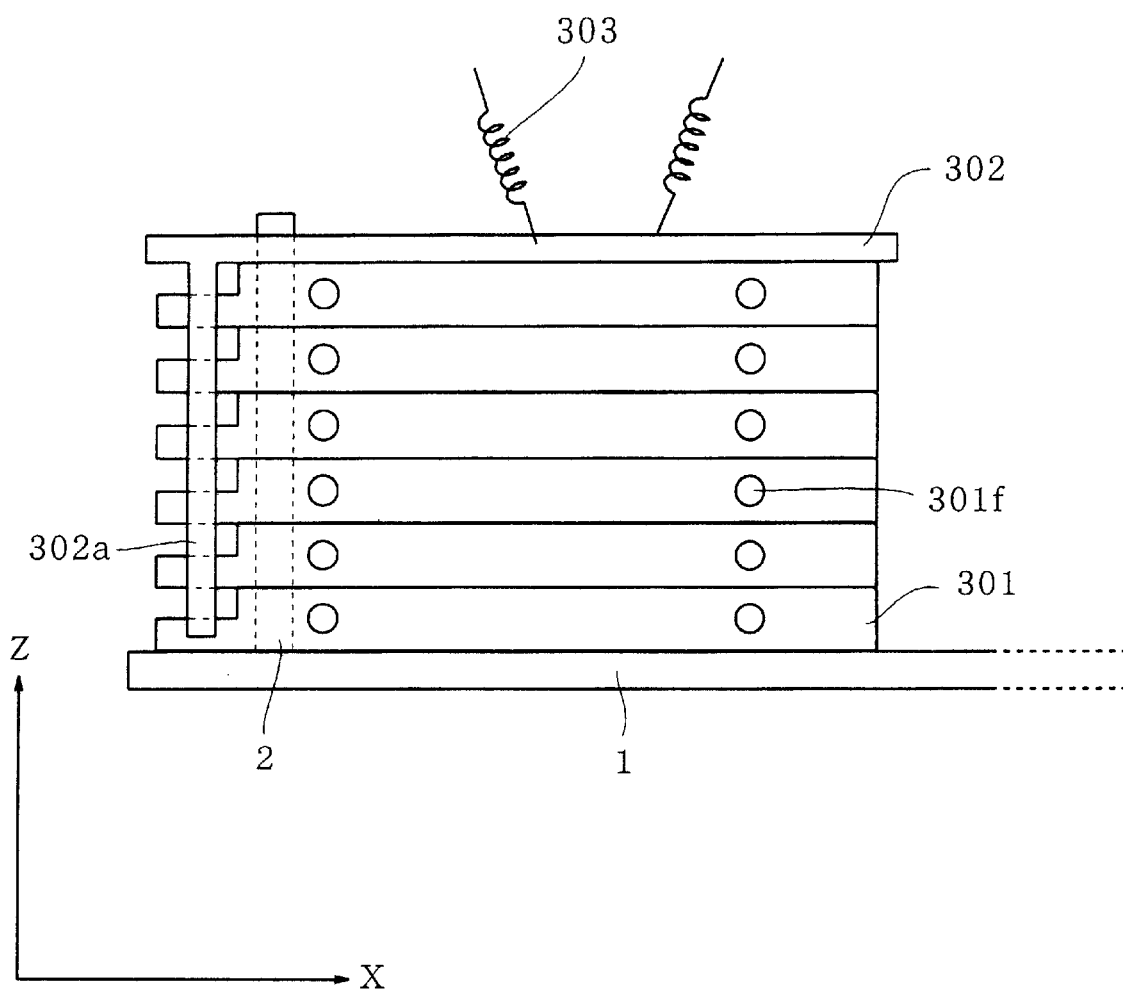
FIG. 4 is a side view of a tray stack.

As shown in FIG. 4, the shaft 2 is inserted in the holes 301d of six trays 301 and a hole of a regulating plate 302 on the stack of trays, thereby arranging the trays in the Z-direction. The regulating plate 302 is urged by springs 303 provided inside wall of the chassis 1 so that regulating plate 302 is prevented from upwardly moving. The regulating plate 302 has a vertical member 302a to hold the trays, thereby preventing the trays from moving in the Y-direction.

Figure 5:
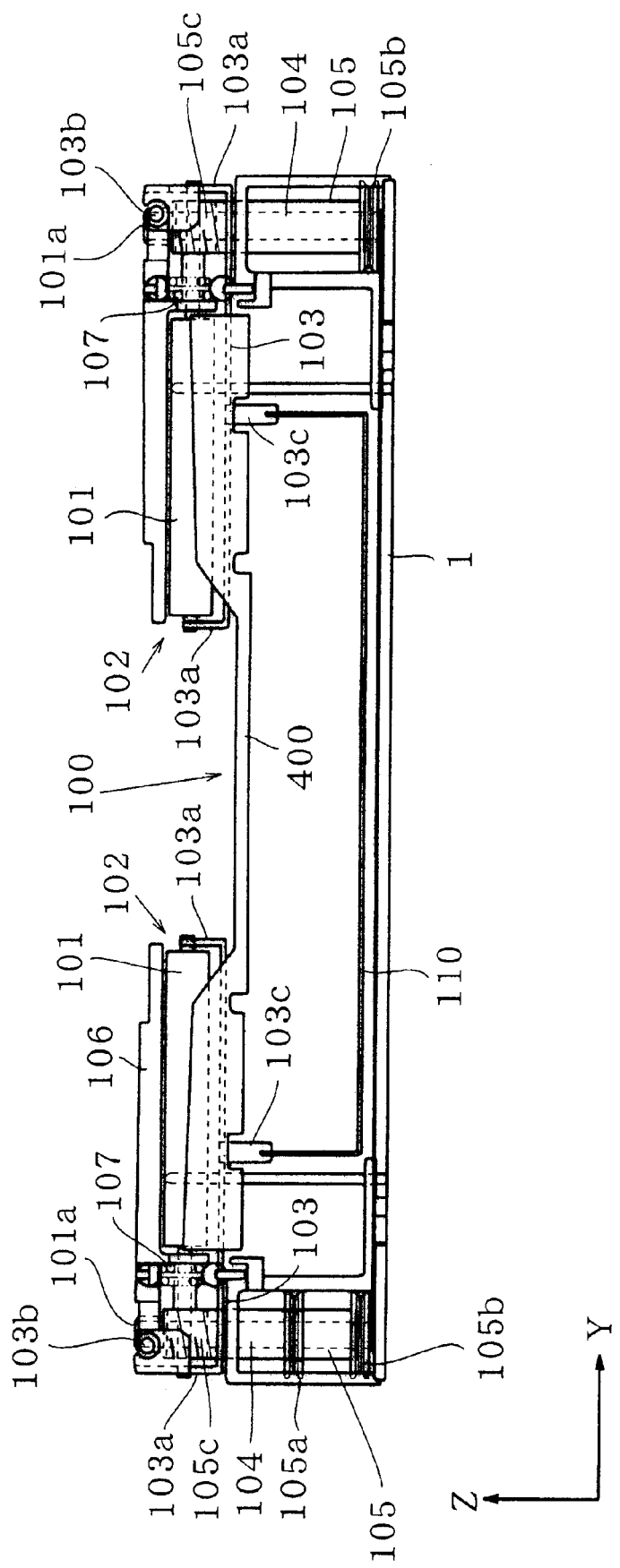
FIG. 5 is a front view of the disc changer.
Figure 6:
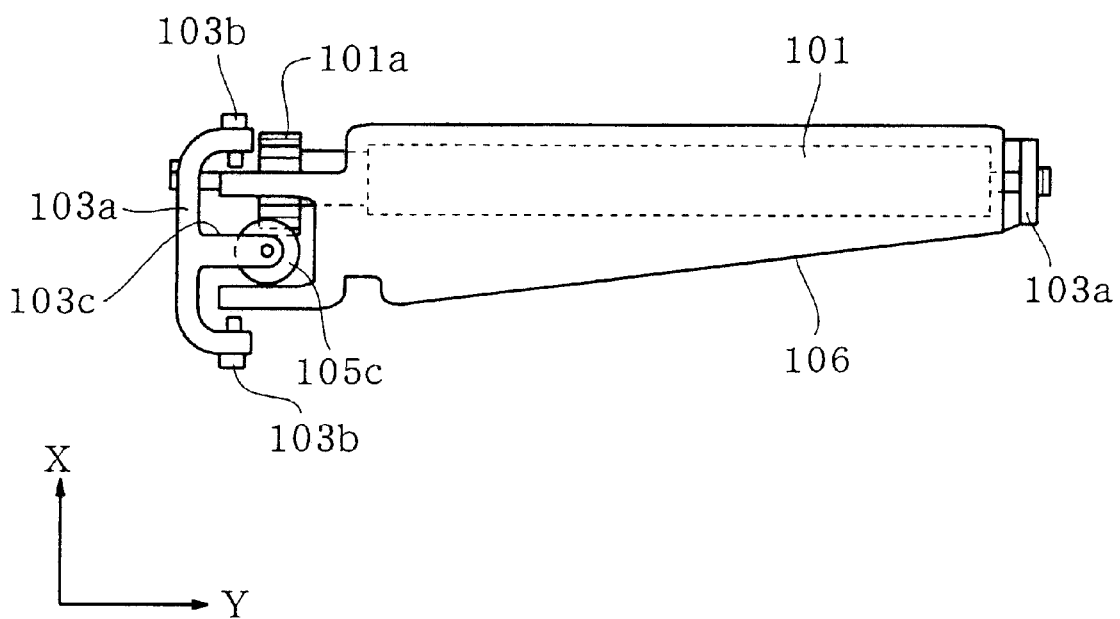
FIG. 6 is a side view of a driving roller.
Figure 7:
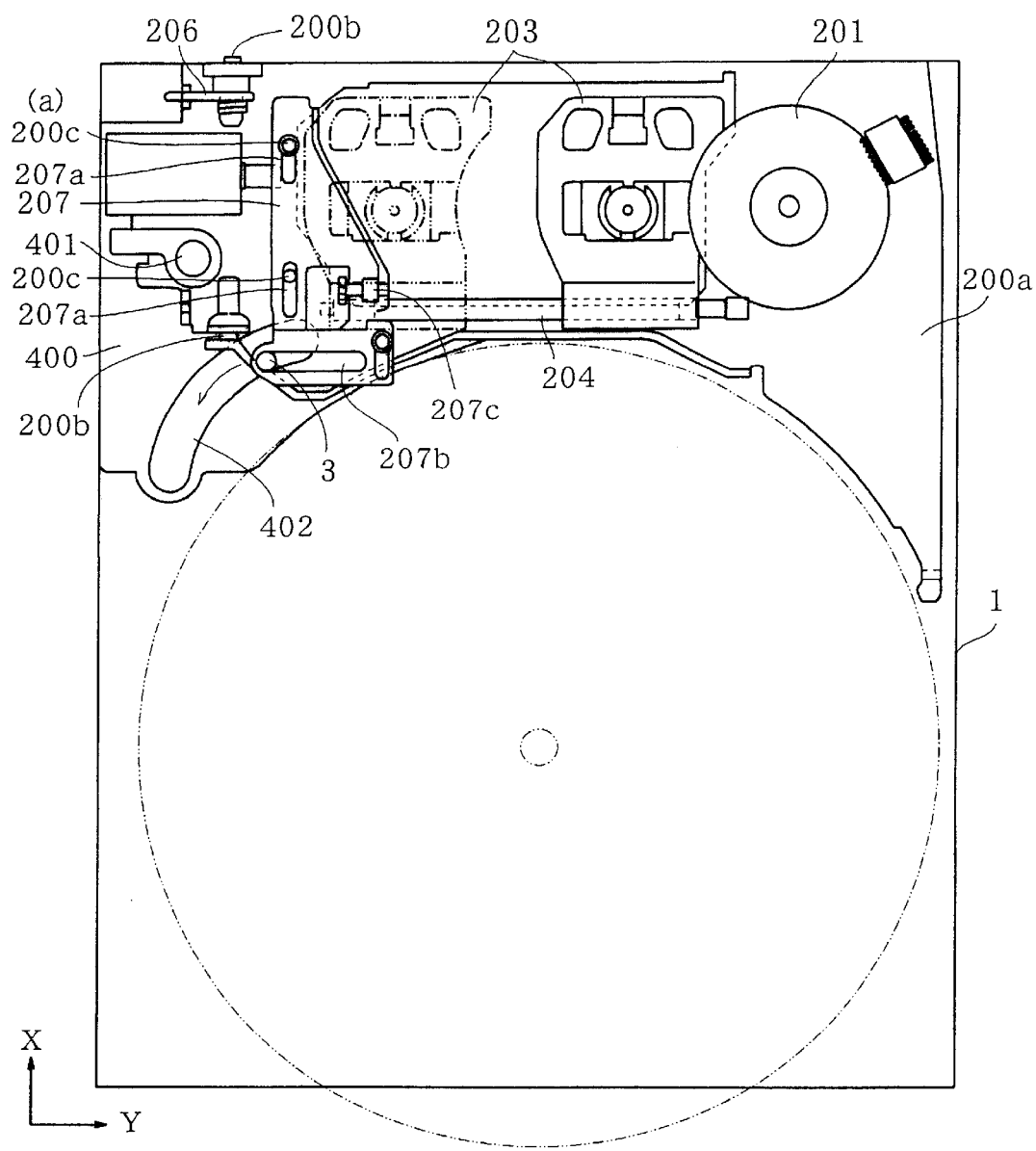
FIG. 7a is a plan view showing a disc player.
FIG. 7b is a plan view showing a clamper.
Figure 7:
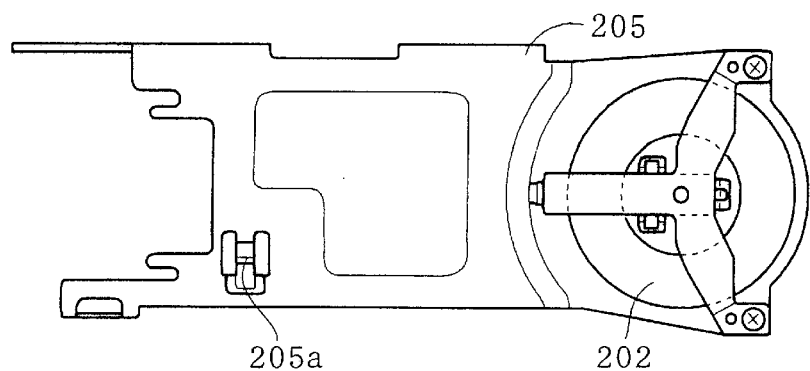
Figure 8:
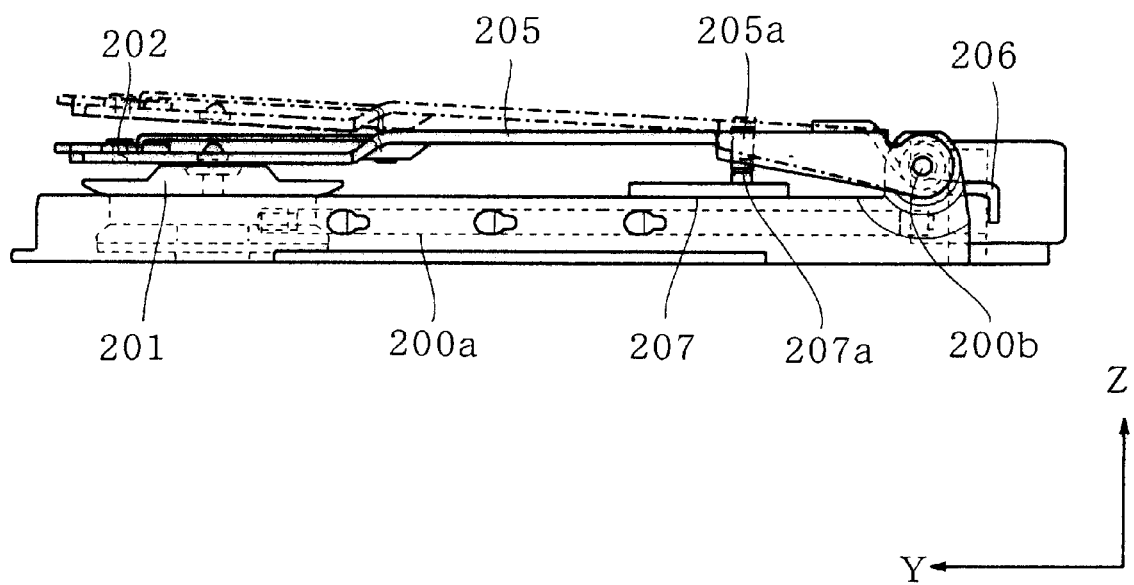
FIG. 8 is a side view showing a turntable.
Figure 9:
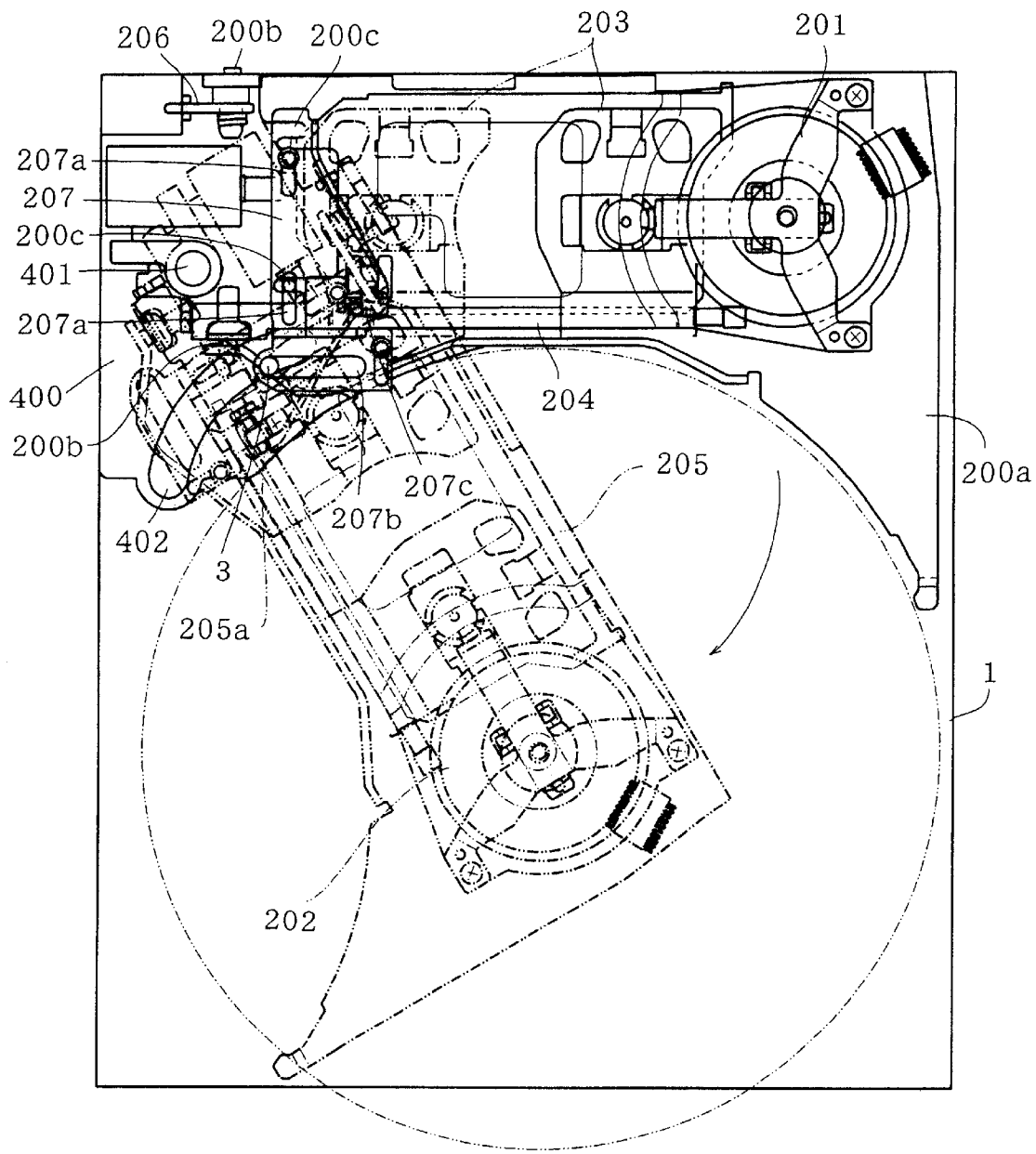
FIG. 9 is a plan view showing the operation of the disc player.

Referring to FIGS. 5 and 6 showing the disc carrier 100, a worm wheel 101a is formed on a side of each driving roller 101. The driving roller 101 is rotatably mounted on an upright plate 103a of a supporting plate 103. A disc path regulating plate 106 is provided above the driving roller 101 and rotatably supported by a shaft 103b. Between the plate 106 and the driving roller 101, a disc carrying path 102 is formed. A coil spring 107 is provided between the regulating plate 106 and the supporting plate 103 to urge the plate 106 toward the driving roller 101.

A pair of rotatable shaft 105 are rotatably mounted on shafts 104. An upper portion of the rotatable shaft 105 is supported by the supporting plate 103 and a worm 105c is formed on an upper most portion of the rotatable shaft. The worm 105c is engaged with the worm wheel 101a of the driving roller 101. A pulley 105a is formed on one of the rotatable shafts 105, which pulley 105a engages with a belt 109 of a motor 108 (FIG. 2). Both rotatable shafts 105 have pulleys and are connected by a belt (not shown). Thus, both the shafts 105 are rotated by the motor 108 through the belts.

Each supporting plate 103 has a downwardly projecting projection 103c, passing through a hole formed in a movable plate 400. A movable member 110 is slidably mounted on the chassis 1 and engaged with the projection 103c. Therefore, when the movable member 110 moves in the X-direction, each of the plates 103 is rotated about the shaft 104 to rotate the driving roller 101 about the shaft 104.

Due to the above described construction, the driving rollers 101 are moved between a disc carrying position and a retracted position. FIG. 2a shows the driving roller 101 at the disc carrying position, and FIG. 2b shows the one at the retracted position.

When the driving rollers 101 are located at the disc carrying position, the rollers are inserted in the notches 301c as shown in FIG. 2a. At the positions, rollers are positioned in the Y-direction, where the rollers are parallel with the roller insertion opening and located on the disc mounted on the disc supporting plate 301a.

The driving rollers 101 at the retracted position are positioned outside the notches 301c as shown in FIG. 2b.

FIGS. 7a to 9 show the disc player 200 and the disc moving mechanism. On a base 200a of the disc player 200, there is provided the turntable 201, pickup 203, and pickup moving mechanism 204. The base 200a is rotatably supported by a shaft 401 on the movable plate 400. A clamper base 205 is rotatably supported by a shaft 200b on the base 200a and holds the clamper 202 at an end portion. A restriction portion 205a is formed on the clamper base 205. The clamper base 205 is urged to the base 200a by a spring 206 mounted on the shaft 200b.

On the base 200a, a clamp operation member 207 is provided. There is provided a pair of elongated holes 207a, an elongated hole 207b perpendicular with the holes 207a, and a roller 207c. In each hole 207a, engaged is a pin 200c projected from the base 200a, so that the member 207 is movable in the axis direction of a shaft 200b on the base 200a.

The movable plate 400 has an arcuated hole 402 in which a movable pin 3 is inserted. The pin 3 is further engaged with the elongated hole 207b. The pin 3 is moved in the arcuated hole 402 by a driving mechanism (not shown).

The movement of the pin 3 causes the movement of the disc player between the reproduction position and the retracted position and the disc clamp operation.

In FIG. 7a, the disc player 200 is at the retracted position, where the restriction portion 205a of the clamper base 205 is mounted on the roller 207c of the clamp operating member 207, thereby releasing the clamper 202 from the turntable 201.

When the pin 3 is moved in the direction shown by the arrow, the operating member 207 and base 200a are rotated about the shaft 401 in the clockwise direction. Thus, the disc player 200 is rotated to the reproduction position shown by dot and dash lines in FIG. 9.

Immediately before the reaching of the pin to the end of the arcuated hole 402, namely, immediately before the time when the disc player reaches the reproduction position, the driving direction of the pin 3 becomes parallel with the longitudinal direction of the elongated holes 207a of the operating member 207. Therefore, only the operating member 207 is moved in the longitudinal direction with respect to the base 200a, so that the restriction portion 205a of the base 205 removes from the roller 207c. As a result, the clamper 202 is pressed against the turntable 201 by the coil spring 206.

As described above, the disc clamp operation is carried out with the movement of the disc player 200 from the retracted position to the reproduction position, and the clamping is done at the same time as the positioning of the disc player 200 to the reproducing position. The clamp is released when the disc player moves from the reproduction position to the retracted position.

Figure 10:
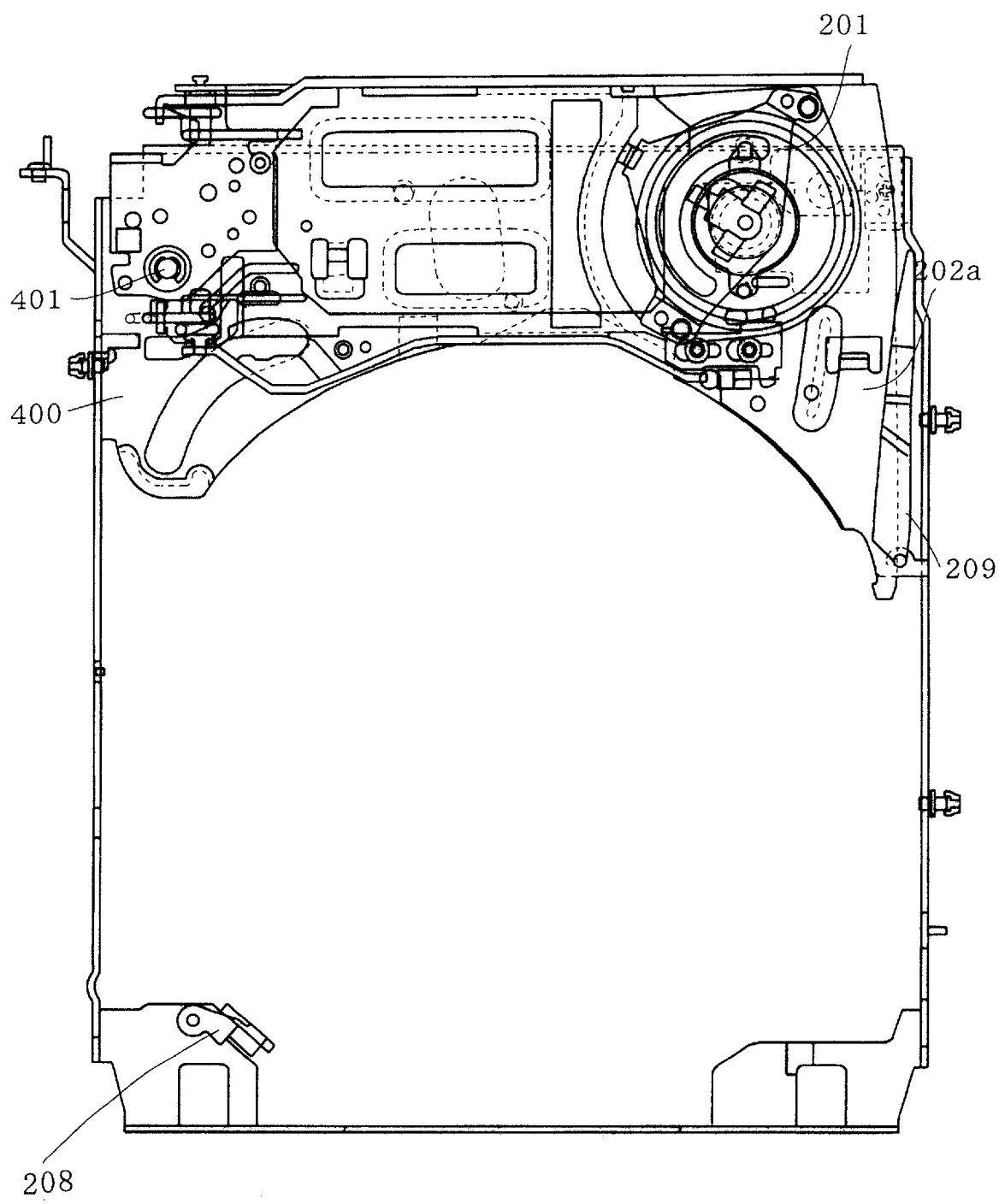
FIGS. 10 to 12 are plan views showing another example of a moving mechanism.
Figure 11:
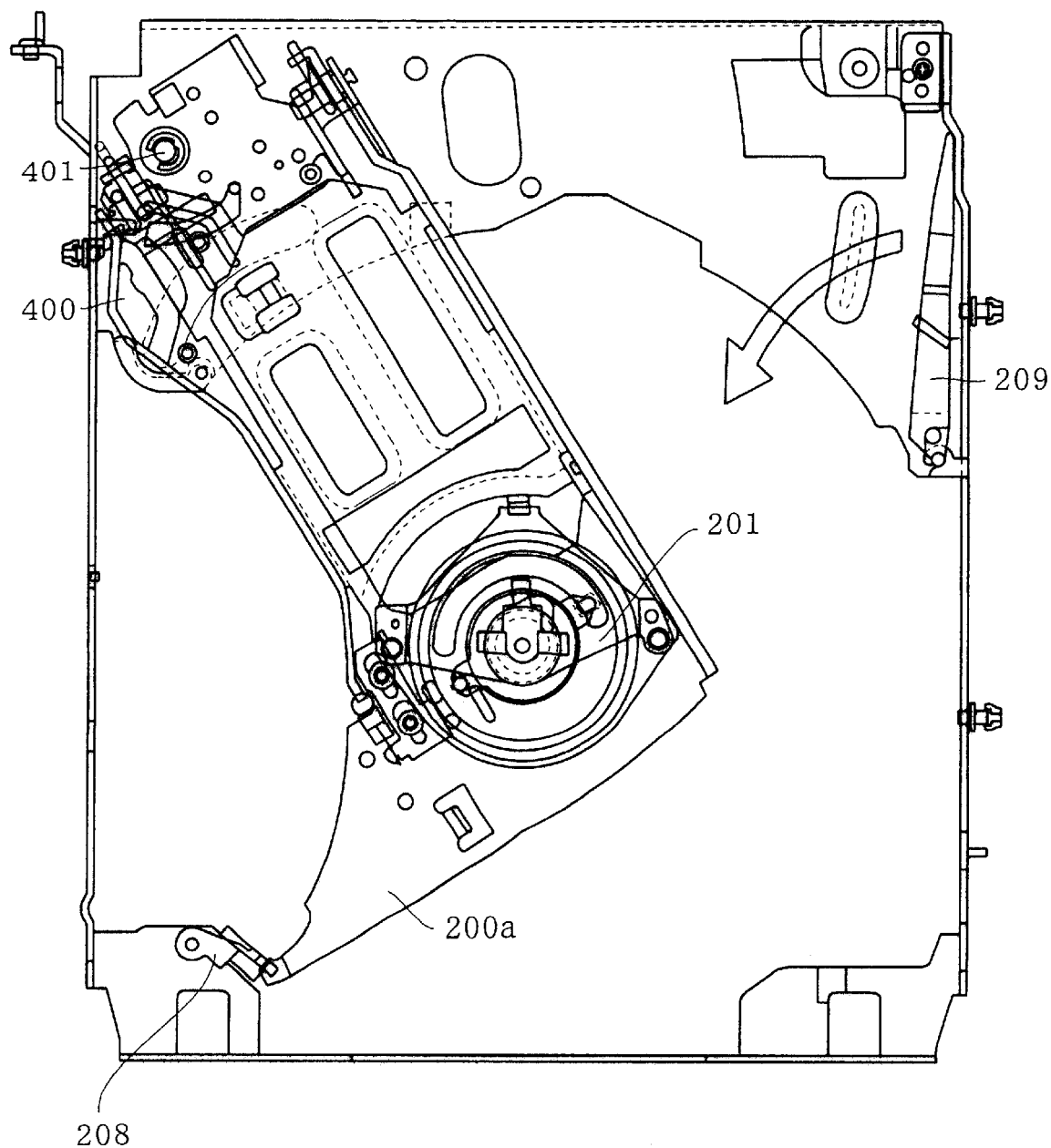
Figure 12:
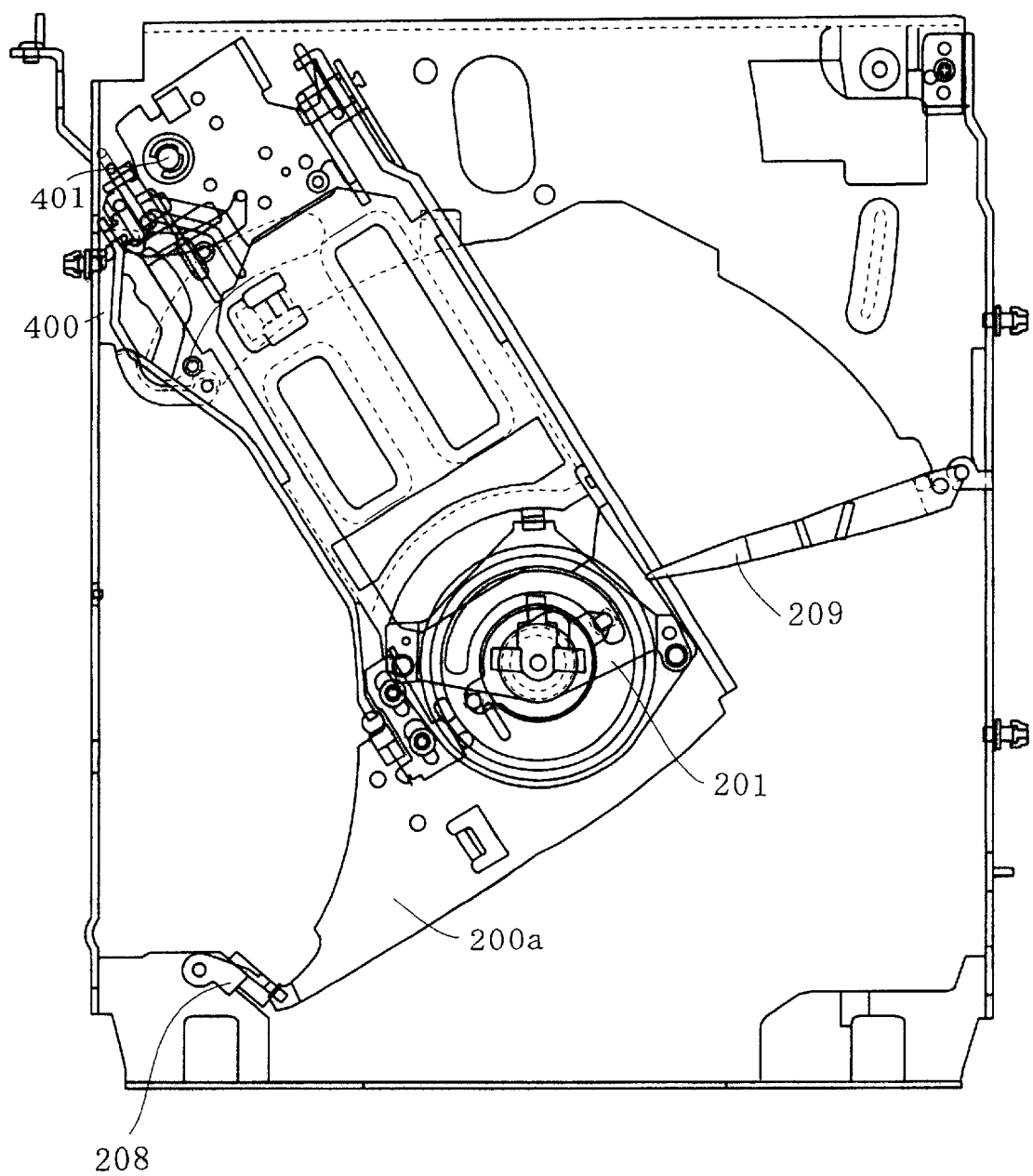

FIGS. 10 through 12 show another example of the moving mechanism of the disc reproducing portion shown in FIGS. 7a to 9.

In the moving mechanism, a lock member 208 and a lock arm 209 are provided on the movable chassis 400. The lock member 208 engages with an end portion of the base 200a when the base reaches the reproducing position as shown in FIG. 11. The lock arm 209 is provided to be rotated between a retracted position shown in FIG. 10 and a lock position shown in FIG. 12.

After the base 200a has reached the reproducing position shown in FIG. 11, the lock arm 209 is rotated from the retracted to the reproducing position as shown by the arrow of FIG. 11, and an end portion of the arm engages with an end portion of the base 200a as shown in FIG. 12.

Thus, the base 200a is held by the lock member 208, the lock arm 209 and the shaft 401, so that the base 200a is not vibrated by the external vibration during the reproduction of a disc.

The engaging position of the lock member 208 with the base 200a and the engaging position of the lock arm 209 are at both sides of the line connecting the shaft 401 and the center of the turntable 201. Furthermore, the center of the turntable is in an area surrounded by three lines connecting the engaging portion of the lock member 208, the engaging portion of the lock arm 209, and the shaft 401. Therefore, the turntable is stably supported, thereby preventing the reproduced disc from vibrating.

Figure 13:
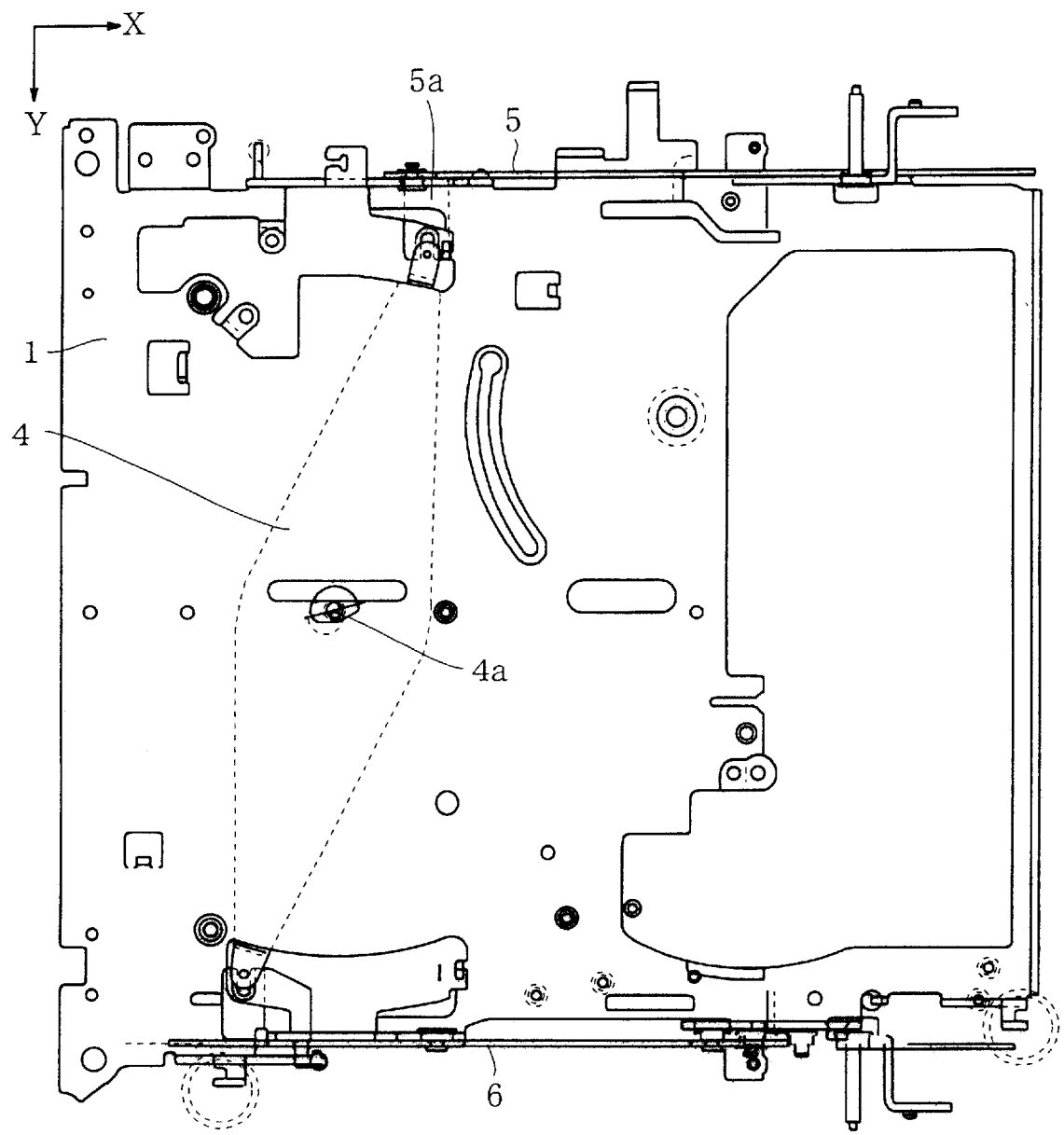
FIG. 13 is a plan view showing a chassis.
Figure 14:
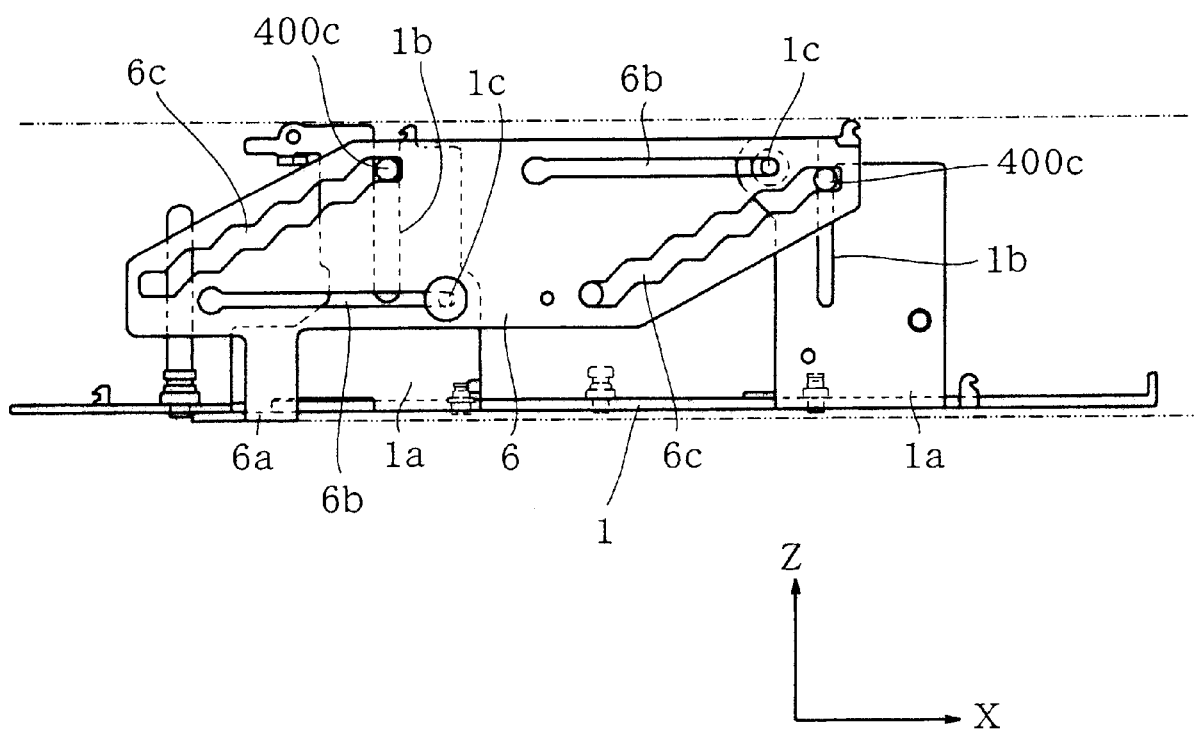
FIG. 14 is a side view showing a slide plate.

FIG. 13 shows the chassis 1 and FIG. 14 shows the tray moving mechanism.

Referring to FIG. 13, an arm 4 is rotatably supported by a shaft 4a at the underside of the chassis 1. The arm is adapted to be pivoted by a motor (not shown).

As shown in FIGS. 1, 13 and 14, a pair of vertical guide plates 1a are formed on both sides of the chassis 1, in the Z-direction. Slide plates 5 and 6 are slidably attached on the guide plates 1a. The slide plates 5 and 6 have projections 5a, 6a at the lower ends thereof, which projections are pivotally connected to both ends of the arm 4. Therefore, when the arm 4 is pivoted, the slide plates are moved in the opposite directions.

As shown in FIG. 14, the slide plate 6 has a pair of holes 6b in the X-direction, each of the holes 6b slidably engages with a pin 1c on the guide plate 1a. The slide plate 5 has also the same holes as 6b. Each guide plate 1a has a vertical guide hole 1b in which slidably engaged is a pin 400c provided on a vertical plate 400b of the movable plate 400. Furthermore, the pin 400c is slidably engaged with a stepwisely inclined heaving hole 6c formed in the slide plate 6. The slide plate 5 has also heaving hole inclined in the reverse direction to the hole 6c. Thus, four pins 400c engage with the heaving holes and are moved in the Z-direction when the slide plates 5 and 6 moves in the X-direction, which causes the movable plate 400 to vertically move.

The heaving hole has six steps which corresponds to the six trays.

Figure 15:
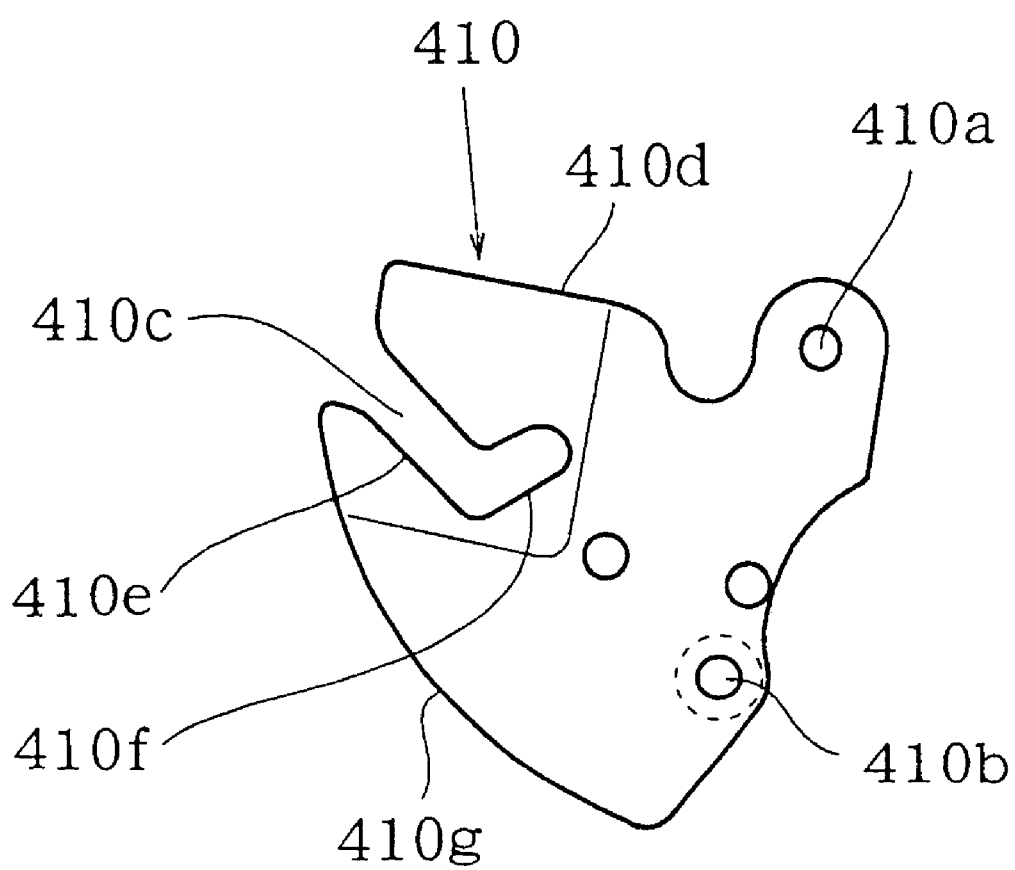
FIG. 15 is a side view showing a disc separating member.

FIG. 15 shows one of four tray moving members 410 which are pivotally mounted on the vertical plate 400b at a shaft 410a. A projection 410b is slidably engaged with an arcuated groove 400d formed in the vertical plate 400b. The tray moving member 410 has an L-shaped hole 410c in which a projection 301f (FIG. 3) of the tray 301 can be held. There is formed four cams 410d, 410e, 410f and 410g which are engaged with the projections 301f.

The operation of the device will be described hereinafter with reference to FIGS. 16 through 22. FIGS. 16 through 20 show the operation for mounting a disc inserted from the opening on the tray 301 of the disc storage 300. The operation is described about the mounting of the inserted disc on the second tray from the lower most tray.

Figure 16:
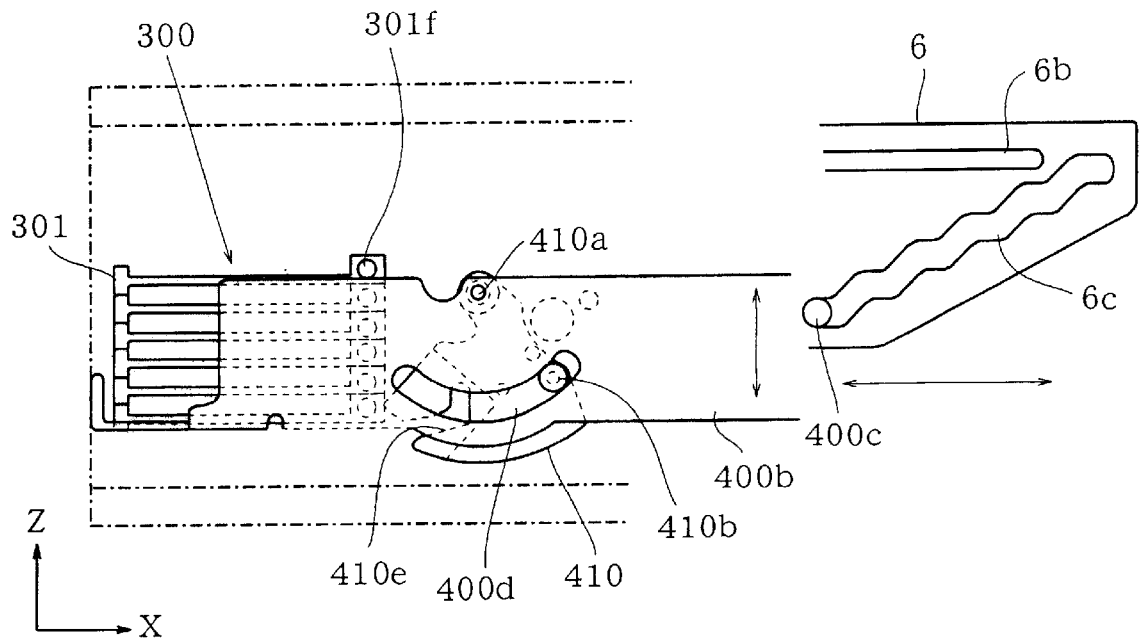
FIGS. 16 to 22 are side views showing the operation of the disc changer.

FIG. 16 shows a waiting state. In the state, all trays are stacked up. The pin 400c is mounted on the lower most step of the inclined hole 6c, and the movable plate 400 is positioned at the lower most position. The tray moving member 410 is retracted from the tray 310 so that the tray moving member does not strike the tray when the movable plate 400 moves.

When the user inserts a disc in the opening, the slide member 6 is moved to the left and the slide member 5 is moved to the right by the arm 4 to raise the movable plate 400. When the pin 400c reaches the second step as shown in FIG. 14, the slide member 6 (the description about the slide member will be omitted hereinafter) stops to stop the movable plate 400. At the position, the tray moving member 410 holds the second tray 301, engaging with the underside of the tray.

More particularly, the tray moving member 410 is rotated in the clockwise direction, so that the cam 410d raises the projection 301f of the third tray, thereby lifting the third through sixth trays.

On the other hand, the projection 301f of the second tray mounts on the cam 410e and enters the hole 410c. Thus, the second tray is held by the tray moving member 410.

Next, the slide member 6 is moved to the left to lift the movable plate 400. Therefore, the third to sixth trays are raised by the cam 410d, and the second tray is raised by the cam 410e, leaving the first tray.

Figure 18:
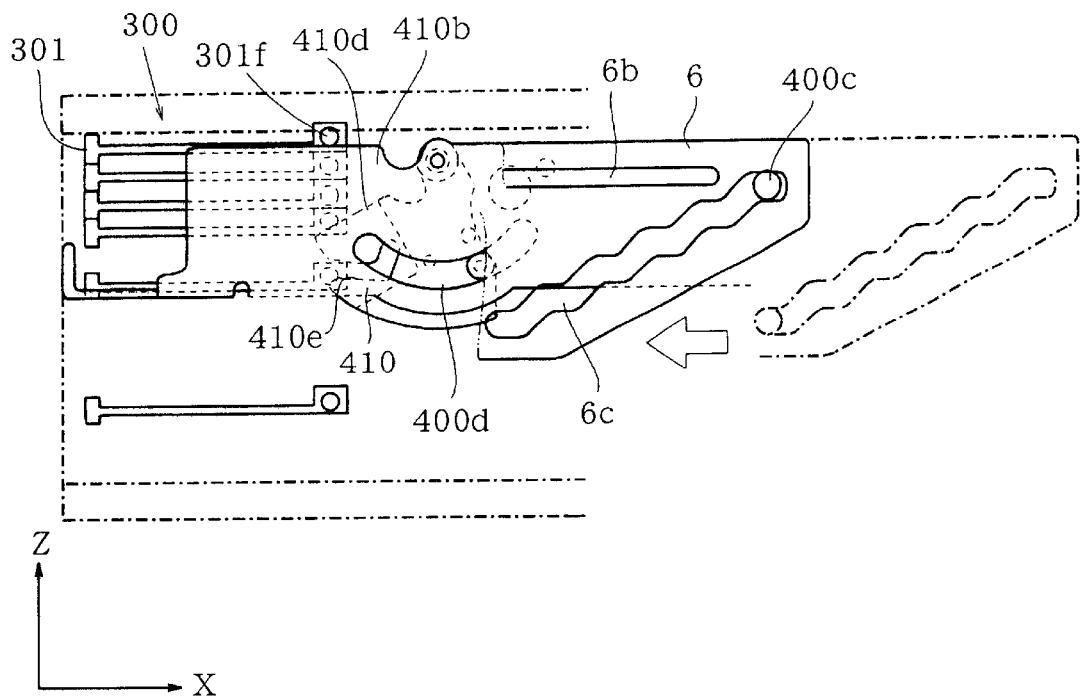

As shown in FIG. 18, when the pin 400c reaches the upper most step, the slide member 6 stops. The second tray held by the tray moving member 410 is placed at a position corresponding to the upper most tray position before the lifting shown in FIG. 15. This position corresponds to the position of the driving roller 101 of the disc carrier 100 (FIG. 5), where the insertion and discharge of the disc are performed at the height.

Figure 19:
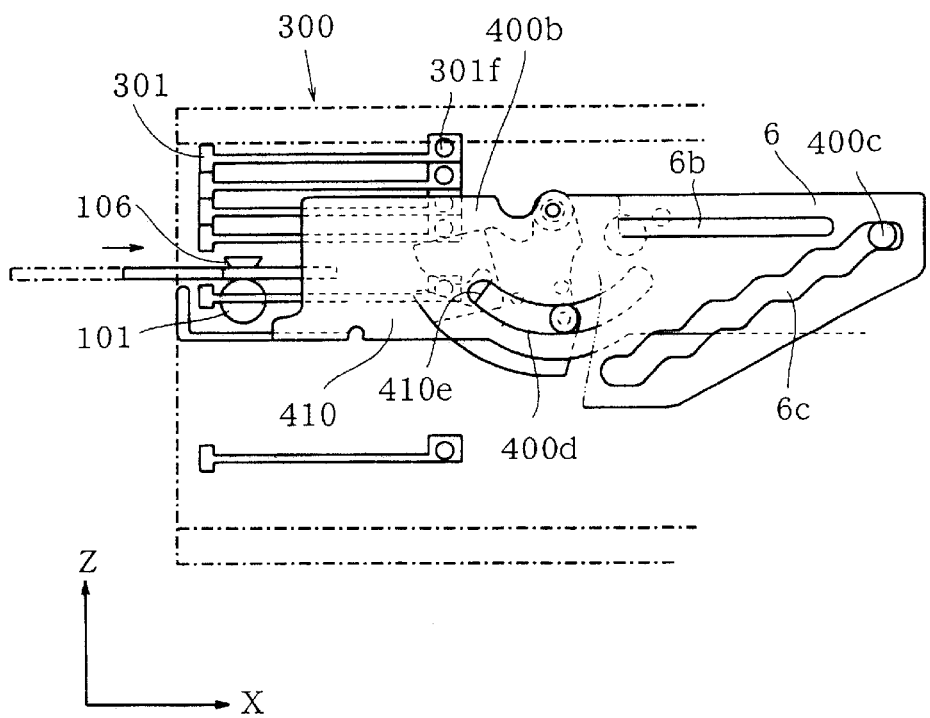

As shown in FIG. 19, the tray moving member 410 is slightly rotated in the clockwise direction, so that the third through sixth trays are raised by the cam 410d although the second tray is not raised. Thus, there is formed a space above the second tray, in which space the driving roller 101 can be inserted. Therefore, the driving roller 101 is moved from the retracted position (FIG. 2b) to the disc carrying position (FIG. 2a).

Thereafter, the driving roller 101 is driven so that the disc inserted by the user is carried. When the disc reaches the second tray, the driving roller 101 is stopped.

Figure 20:
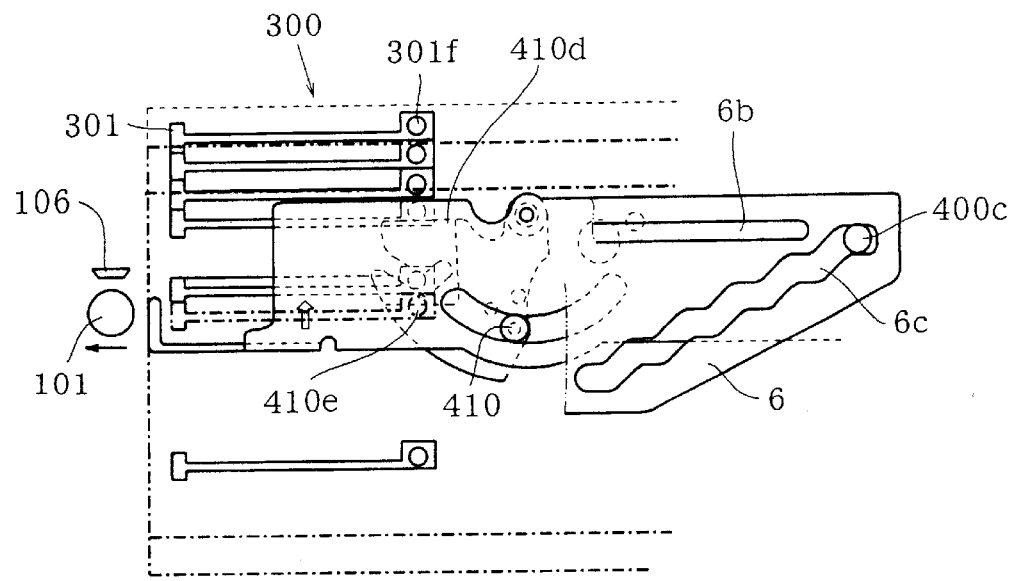

Thereafter, as shown in FIG. 20, the tray moving member 410 is slightly rotated in the clockwise direction, so that the second tray 301 is slightly elevated by the cam 410e. Thus, the inserted disc is mounted on the disc supporting plate 301a of the tray.

Next, as shown in FIG. 20, the driving roller 101 is moved from the disc carrying position to the retracted position. At that time, the driving roller moves while rotated in the disc feeding direction. Therefore, the disc is not moved to the retracted position. When the driving roller reaches to the retracted position, the disc is released from the roller, so that disc falls on a holding surface 301a (FIG. 2b) of the second tray.

Thereafter, the slide member 6 is moved to lower the movable plate 400. When the pin 400c reaches the second step, the slide member 6 is stopped. Therefore, the plate 400 is positioned at the position shown in FIG. 17. Furthermore, the tray moving member 410 is rotated in the counterclockwise direction so that cams 410d and 410e are released from the projections 301f of the trays.

Next, the slide member 6 is further moved. When the pin 400c reaches the lower most step, the slide member is stopped. Thus, the operation for carrying the disc to the tray finishes.

The operation for discharging disc is the same as the above described operation except the rotating of the driving roller 101 in the disc discharge direction.

The operation for reproducing the disc held on the tray will be described hereinafter.

In the waiting state shown in FIG. 16, when the reproduction of the disc held on the second disc is instructed, the movable plate 400 is raised so that the tray moving member 410 and the disc player 200 are positioned at the second tray.

Figure 17:
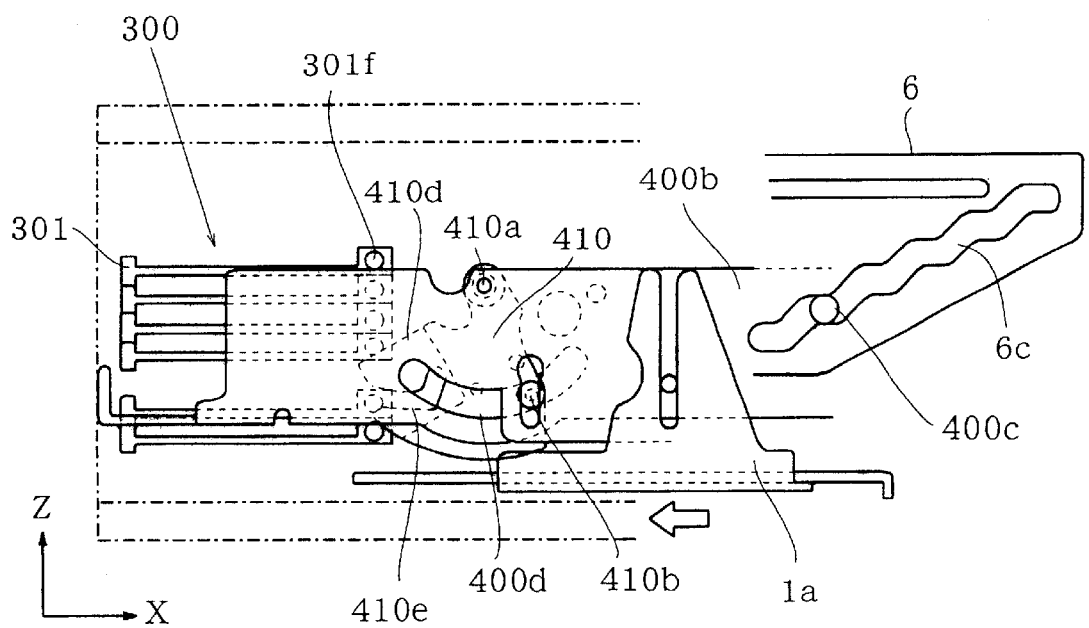

Next, a space for inserting the disc player 200 is formed between the second tray and the third tray, by the rotation of the tray moving member 410 in the clockwise direction, which operation is the same manner as above description as shown in FIG. 17.

Figure 21:
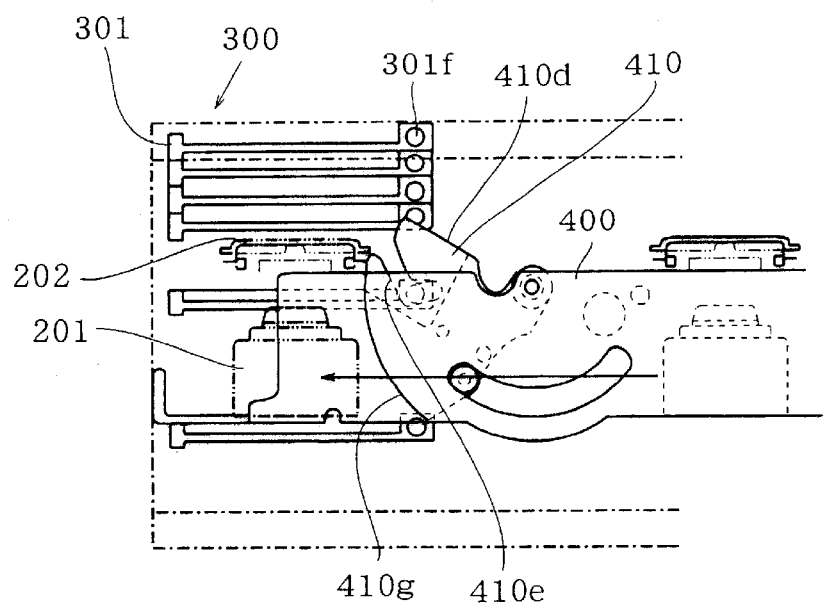

Thereafter, the tray moving member 410 is further rotated in the clockwise direction, so that the third to sixth trays are moreover raised from the position of FIG. 17. At the same time, the second tray is raised by the cam 410f. On the other hand, the first tray is pressed by the outside of the cam 410e, thereby prevented from moving. Thus, as shown in FIG. 21, a large space is formed under the second tray, so that the player 200 can be inserted. The projection 301f of the second tray is deeply inserted in the hole 410c to be held by the tray moving member 410.

Next, the disc player 200 is moved from retracted position to the reproduction position in the above described spaces by the player moving mechanism as shown in FIG. 12. At that time, the clamper 202 and the turntable 201 are separated from each other as shown in FIG. 21. When the player 200 is positioned at the reproduction position, the clamper 202 is lowered to clamp the disc on the turntable 201. At the same time, the tray moving member 410 is slightly rotated in the counterclockwise direction to lower the second tray.

Figure 22:
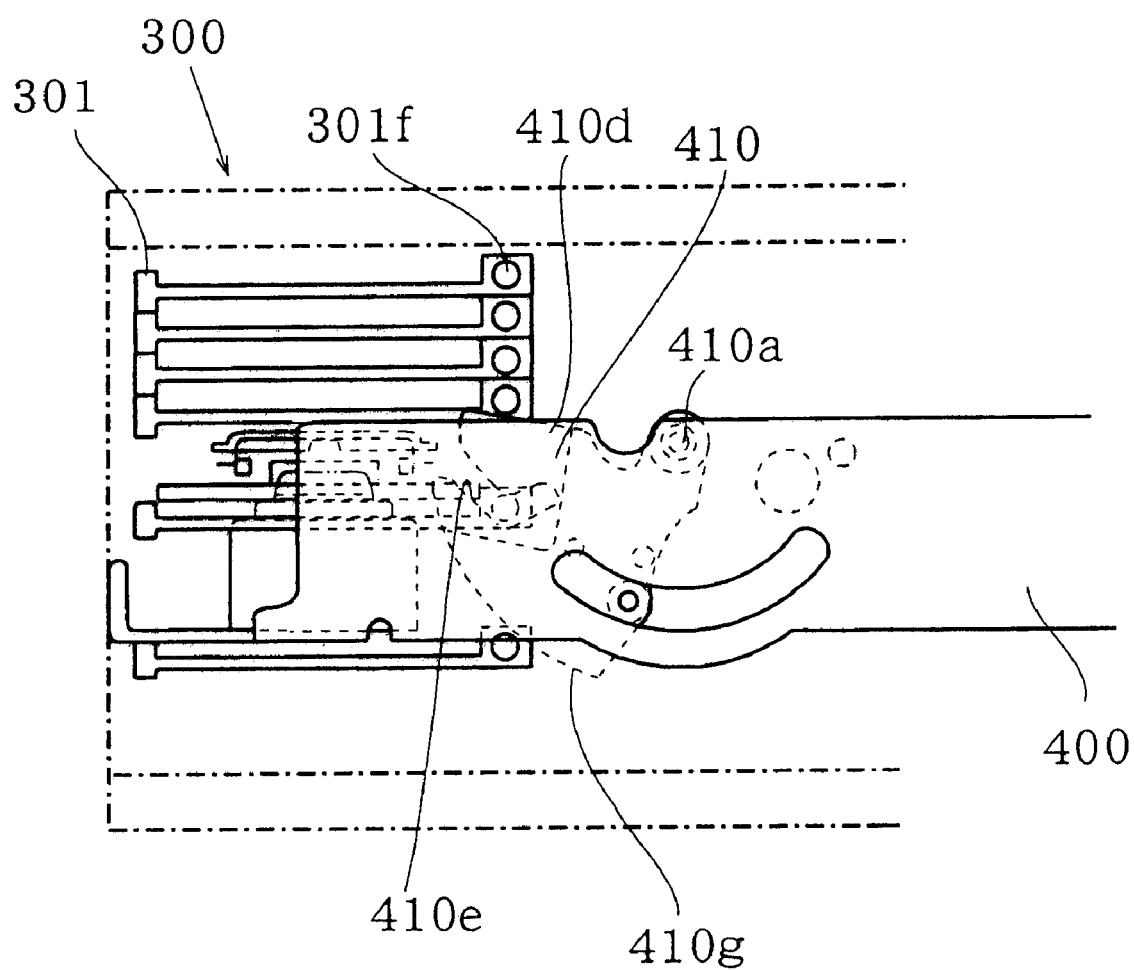

Therefore, the disc on the second tray is clamped by the clamper and the turntable as shown in FIG. 22. Thus, the disc is reproduced.

The rotation of the tray moving member 410 in the counterclockwise direction causes the third tray through sixth tray to lower from the position of FIG. 21 to the position of FIG. 22. The space occupied by the six trays is consequently reduced, thereby reducing the space necessary for the floating support of the device. Thus, the whole size of the device is reduced as described below.

Figure 23:
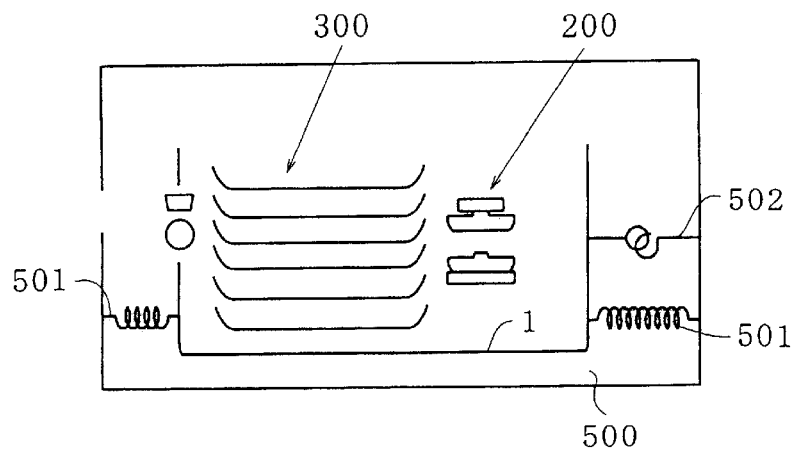
FIGS. 23a to 23c are schematic illustrations for explaining advantages of the present invention.
Figure 23:
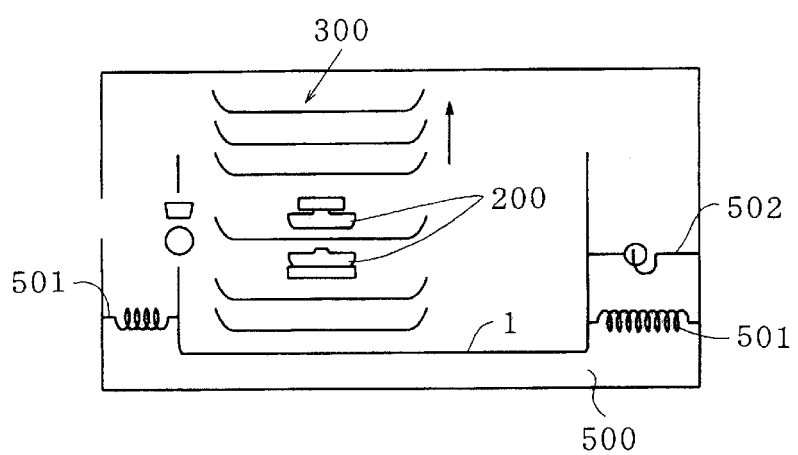
Figure 23:
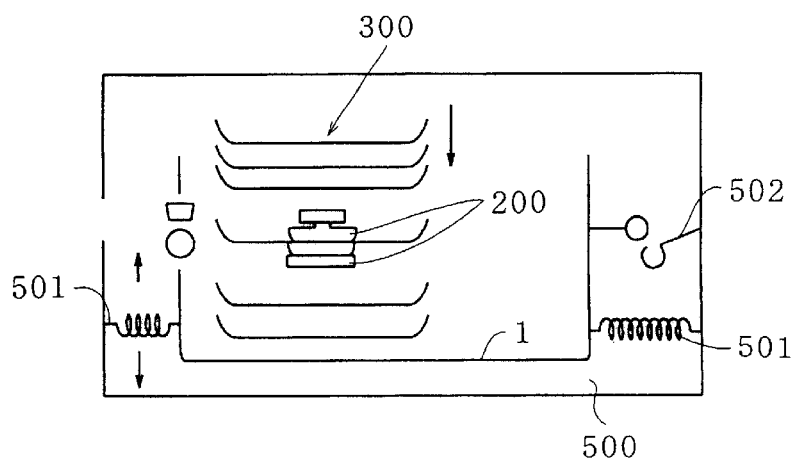

Referring to FIGS. 23a through 23c, FIG. 23a shows the condition where the disc player 200 is at the retracted position, FIG. 23b shows the player is at the reproducing position, and FIG. 23c shows the disc reproducing state.

The chassis 1 is supported by springs 501 in a case 500 in a floating state. A floating lock device 502 is provided for locking the chassis 1.

In the condition of FIG. 23b, the space occupied by the storage 300 becomes maximum. If the reproducing device is composed to reproduce the disc in the condition of FIG. 23b, the case 500 must be formed to have a size larger than the maximum space.

In the embodiment of the present invention, since the space occupied by the storage is reduced during the reproduction of the disc where the locking is released, it is not necessary to increase the size of the case from the maximum space of FIG. 23b, and hence the space necessary to the floating support can be ensured by the maximum space. Thus, the case can be reduced in size to a minimum size.

It will be understood that the reproducing device of the present invention can be made thinner than the conventional device where the whole of the storage is moved in order to select a desired disc.

While the invention has been described in conjunction with preferred specific embodiment thereof, it will be understood that this description is intended to illustrate and not limit the scope of the invention, which is defined by the following claims.

What is claimed is:

1. A disc reproducing device comprising:
   a disc storage having trays arranged in a disc arranging direction, each of which holds a disc;
   a tray moving member moving the trays in the disc arranging direction; and
   a disc player including a turntable, movable between a retracted position and a disc reproducing position;
   wherein the tray moving member moves so that a space, in the disc arranging direction, between a desired disc tray having a desired disc and an adjacent disc tray, widens for an entering action of the disc player into the disc storage, and becomes narrower than said space for the entering action after a clamping action of disc player to the desired disc is completed, said narrowed space is maintained during reproduction of the desired disc.

2. The device according to claim 1, wherein the disc arranging direction is a vertical direction, and the trays are stacked.

3. The device according to claim 1, wherein the tray moving member is rotatably mounted on a movable member for moving the tray moving member in the disc arranging direction.

4. The device according to claim 3, wherein the tray moving member has a cam for moving the trays in the disc arranging direction to form the space.

5. The device according to claim 3, further comprising:
   a pair of slide plates, each has at least one inclined hole having steps corresponding to the trays; and
   a pin secured to the movable member and engaged with the at least one inclined hole; wherein the pin slides along the at least one inclined hole.

6. A disc reproducing device comprising:
   a disc storage having trays arranged in a disc arranging direction, each of which holds a disc;
   a tray moving member moving the trays in the disc arranging direction; and
   a disc player including a turntable, movable between a retracted position and a disc reproducing position;
   wherein the tray moving member moves so that a space, in the disc arranging direction, between a desired disc tray having a desired disc and an adjacent disc tray, widens for an entering action of the disc player into the disc storage, and becomes narrower than said space for the entering action after a clamping action of disc player to the desired disc is completed,
   wherein further the tray moving member is rotatably mounted on a movable member for moving the tray moving member in the disc arranging direction, and
   wherein the disc player is pivotally mounted on the movable member, and a driver is provided for rotating the disc player.

7. The device according to claim 1, further comprising:
   a chassis disposed within a case, and supporting the disc storage and the disc player;
   a floating device supporting the chassis within the case; and
   a floating lock for locking the chassis to the case;
   wherein the floating device begins to float the chassis when the floating lock is released and after the clamping action.

8. The device according to claim 7, wherein the disc player located in the disc storage begins to reproduce the desired disc after the clamping action.

9. A disc reproducing device comprising:
   a disc storage having trays arranged in a disc arranging direction, each of which holds a disc;
   a tray moving member moving the trays in the disc arranging direction; and
   a disc player including a damper and a turntable, movable between a retracted position and a disc reproducing position;
   wherein the tray moving member moves so that a space, in the disc arranging direction, between a desired disc tray having a desired disc and an adjacent disc tray, widens for an entering action of the disc player into the disc storage and for a clamping action of the clamper and the turntable to the desired disc, and becomes narrower than said space for the entering and clamping actions after the clamping action, said narrowed space is maintained during reproduction of the desired disc.

* * * * *